United States Patent [19]

Martin

[11] 4,385,421
[45] May 31, 1983

[54] POULTRY LEG/BACK PROCESSOR

[75] Inventor: Eugene G. Martin, New Holland, Pa.

[73] Assignee: Victor F. Weaver, Inc., New Holland, Pa.

[21] Appl. No.: 265,636

[22] Filed: May 20, 1981

[51] Int. Cl.³ .............................................. A22C 21/00
[52] U.S. Cl. ........................................... 17/52; 17/11
[58] Field of Search .................................. 17/11, 45, 52

[56] References Cited

U.S. PATENT DOCUMENTS 3,675,272 7/1972 Schacht .
4,016,624 4/1977 Martin et al. .
4,019,223 4/1977 Baker .
4,118,829 10/1978 Harben, Jr. .

FOREIGN PATENT DOCUMENTS 1320958 6/1973 United Kingdom .

Primary Examiner—Willie G. Abercrombie
Attorney, Agent, or Firm—Samuel M. Learned, Jr.

[57] ABSTRACT

A poultry leg/back processor wherein backs with legs and thighs attached are manually placed onto a conveyor, second conveyor means of displacing the thigh-legs outwardly from the back, severing means for severing the skin-tissue-tendon at the crotch between the thigh-legs and the back, displacing each thigh-to-back section crotch juncture point by a vertically rotary displacement of each thigh-leg section to an elevated position, and while maintaining the thigh-leg sections in said elevated position relative to the back, moving said back relative to said thigh-leg sections to effect progressive separation of said thigh-leg sections from said back without bone therein.

11 Claims, 13 Drawing Figures

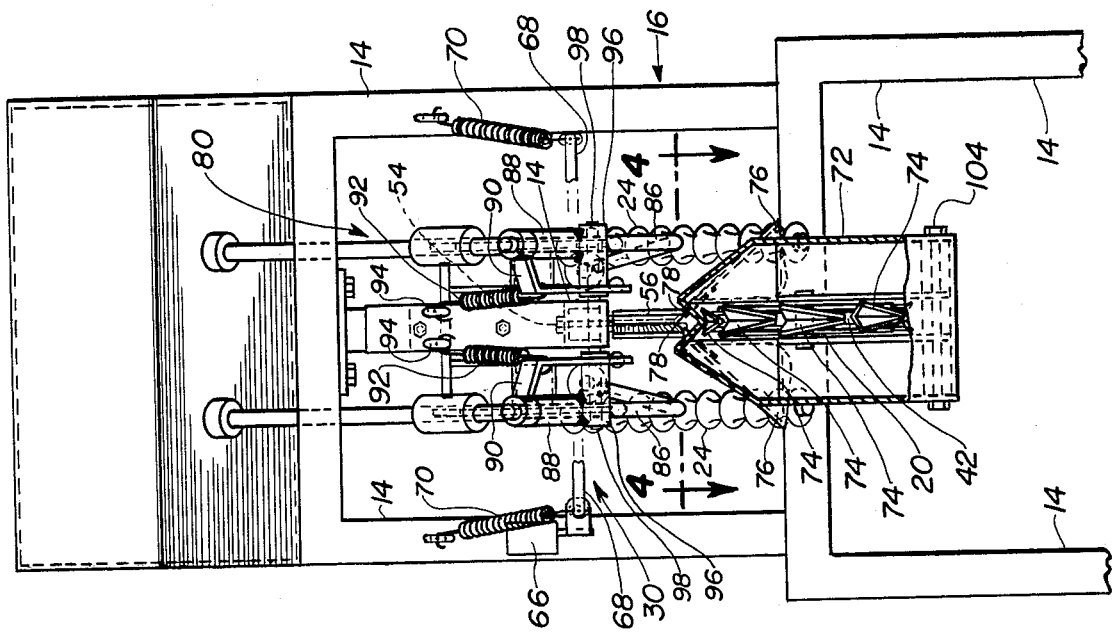

POULTRY LEG/BACK PROCESSOR

BACKGROUND OF THE INVENTION

The present invention relates to poultry leg/back processing operation apparatus and technique, particularly with respect to improvements therein for accomplishing high-speed automated reduction of eviserated and dressed poultry carcass back-half members, commonly called the "saddle" which is comprised of a poultry back with joined thighs and legs depending therefrom further which may be delivered as such from previously accomplished partial processing operations as taught say by the whole poultry carcass transverse halving-cut method of Schacht shown in FIG. 4 of his U.S. Pat. No. 3,675,272 dated July 11, 1972, by the instant technique and apparatus to yield therefrom three separated pieces being the two joined leg and thigh sections removed from the single back section thereof in such a manner as is herein taught to also respectively remove along with the thigh portions of each joined leg and thigh section piece, substantially absent any bone fragment or chip contamination, those highly desirable fleshy morsels known as "oysters" which are appended the outer end of each thigh and removed therewith from their positions of repose within shallow laterally disposed elongated back section cavities proximity of the thigh ball-and-socket joint vicinity of the back section vertebrae and generally parallel thereto wherein upon consideration of the foregoing as hereinafter more fully detailed, it is to be understood that the term poultry is used in the generic context to mean fowl, including but not necessarily limited to old and young chickens, at least small turkeys, and ducks and guineas.

Traditionally, in the automation of poultry sectioning operations the various machines developed therefor have employed in various embodiments the means of piston-driven reciprocating rotary knives or saws in accomplishing the cutting and dismemberment of one carcass section from another, exemplary of which type machine would be that as taught by Baker in his U.S. Pat. No. 4,019,223 dated Apr. 26, 1977, and closer to point as regards applicant's instant teaching would be the double saw blade cutting station operation shown in FIG. 5 of Schacht cited supra for accomplishing the automated separation of joined drum stick and thigh sections from either side of the rear half or saddle of a poultry carcass. When either rotary saw or knife means are employed for accomplishing automated poultry carcass sectioning operations, however, as a consequence of inherent carcass weight and structural variations which translates to automated process guidance and positioning problems with respect to consistent orientation of sequentially fed carcass members to the cutting blade so as to present a line of cut of tissue only, which frequently results in the cutting or crushing of bones with the production of bone fragment or chip contamination in the processed meat which is objectionable and for which there is presently no known particular means or satisfactory method enabling a facilitated removal of any such bone fragment or chip contamination, the singularly most satisfactory way to eliminate the potential bone fragment or chip contamination problem in processing poultry sections for human consumption is to employ dismemberment apparatus and technique enabling operation in such a manner so as to accomplish automated poultry carcass sectioning without the problems of bone cutting or crushing. A machine developed to accomplish automated whole poultry carcass sectioning into the normally available commercially consumed pieces with an objective of reducing by eliminating the problem and hazard of producing poultry pieces with bone fragment or chip contamination therein was that as set forth in instant applicant's prior co-inventive teaching described in U.S. Pat. No. 4,016,624 to Martin et al. dated Apr. 12, 1977, which incorporates a machine station as illustrated in FIGS. 17 through 21 thereof providing saddle member conveyance and guide means to move the back-half carcass member past pre-positioned stationary knife means and sever the principal tendons which hold the balls of the thigh bones within back section vertebra sockets therefor by which the joined leg and thigh sections are connected to the carcass back section, and thereafter during continued guided conveyance spread the joined leg and thigh sections away from each other with respect to the centrally intermediate connecting carcass back section therebetween and upon a sudden stop of each joined leg and thigh section with respect to the continually moving centrally intermediate back section thereby yank from either lateral side thereof the respective joined leg and thigh sections without the production of bone fragments or chips but with the further object of jerking out along with simultaneous dismemberment of the thighs from the back section removal respectively of the oysters from their back section cavities along therewith.

The instant invention, likewise to accomplish intact leg and thigh with joined oyster removal from poultry carcass saddle members also employs the methodology of pre-positioned severing blades to prevent bone fragment or chip contamination, but further employs differential speed screw conveyor means in combination with a modified back section chain conveyor means in such a way that the oysters rather than being yanked are peeled from their back section cavities by the effects of an increasingly smooth variable speed differential, in which regard certain prior art disclosures do show the use of a screw conveyor means with pre-positioning of fixed blades in poultry processing operations such as taught in U.K. Pat. No. 1,320,958 dated June 20, 1973, to Johnson-Stephens, Ltd., wherein a conical helix conveyor screw provided with various guide rod bars is employed to receive, direct, and advance a suspended plucked chicken carcass to a rotary neck-slitting blade for accomplishing craw removal, and at the other carcass extremity as taught by Harben, Jr., in his U.S. Pat. No. 4,118,829 dated Oct. 10, 1978, the use of a pre-positioned fixed blade in combination with co-operative screw conveyor advancement means to accomplish the opening cut on suspended plucked poultry carcasses for eviseration is taught.

Some of the features of the instant invention have, in some respects, both structural and/or functional similarities to various of those teachings separately set forth in the prior art disclosures heretofore cited and briefly discussed. However, as will hereinafter be pointed out, the instant invention is distinguished from said earlier inventions in one or more ways in that the present invention has utility features and new and useful advantages, applications, and improvements in the art of poultry processing machines and methods not heretofore known.

SUMMARY OF THE INVENTION

It is the principal object of the present invention to provide a poultry leg/back processor comprised of a machine having a frame structure and motor means adapted to support in controlled drive operation two separate conveyor systems which operate at relatively differential horizontal transport speeds one with respect to the other, the first of which conveyor system is a single downwardly disposed centrally intermediate elongated main transport machine infeed to delivery end chain conveyor operable coextensively with a spaced set of inclined auger conveyors adapted to receive and engage during guided slidable transport a succession of manually fed tail-end positioned poultry saddle members respectively interior the separate back section portions thereof during simultaneous angularly upward laterally spaced engagements of the hock end knuckles of the joined leg and thigh sections of the saddle member to first accomplish the guided mechanical spreading of the joined leg and thigh sections away from each other with respect to said intermediate carcass back section thereafter to move the then distended thigh crotches into directed engagement with pre-positioned severing blades located to cut through the fleshy crotch tissue thus exposed sufficiently deep to also cut through the principal tendons which otherwise hold the balls of the thigh bones within the back section vertebra sockets therefor and thereafter parallelly transport in concurrent upward rotation by means of said inclined auger conveyors the same to an elevated spaced set of communicating horizontal auger conveyors operable differentially slower in continued horizontal displacement but at a retarded movement relative to the continued longitudinal displacement of the centrally intermediate connecting carcass back section therebetween such that upon continued smoothly increasing differential speed movement of the carcass back section with respect to and away from the more slowly moved horizontal auger conveyor propelled joined leg and thigh sections there is, respectively caused, by means of this second conveyor system, a disjointing of the respective ball-and-socket connections followed by a progressive migratory pull-peeling dismemberment of the laterally distended respective joined leg and thigh sections from the back section with a simultaneous peeling removal along with the thighs of the oysters from their respective relative positions of back section cavity repose proximity of the respective thigh ball-and-socket joints.

It is another object of the present invention to provide a poultry leg/back processor which employs a method of dismemberment to deliver for either consumption or further processing operations sectioned poultry pieces substantially free of bone fragment or chip contamination.

It is a further object of the present invention to provide a poultry leg/back processor which enables a higher yield of desired meat recovery by employing a smooth differential transitory speed pull-peel method of poultry saddle member dismemberment thereby enabling greater processing operation control with a corresponding consistent removal of oysters intact with thighs.

It is also an object of the present invention to provide a poultry leg/back processor adapted to accommodate interchangeable blade assemblies for enabling the accomplishment of different back skin removal cuts.

It is still another object of the present invention to provide a poultry leg/back processor which is relatively safe and simple in operation, as well as a machine which requires a minimum of make-ready time in addition to a machine which may be set and operated by an average employee not possessed of special skills or training.

Details of the foregoing objects of this invention, as well as other objects thereof, are set forth hereinafter as illustrated in the accompanying drawings comprising a part of the application.

BRIEF DESCRIPTION OF THE DRAWINGS

FIG. 2 is an enlarged top plan view of the poultry leg/back processor infeed section shown in FIG. 1 as seen along the line 2—2 thereof.

FIG. 3 is an enlarged end sectional elevation of the poultry leg/back processor infeed section shown in FIG. 1 as seen along the line 3—3 thereof.

DETAILED DESCRIPTION OF THE INVENTION

Figure 1:
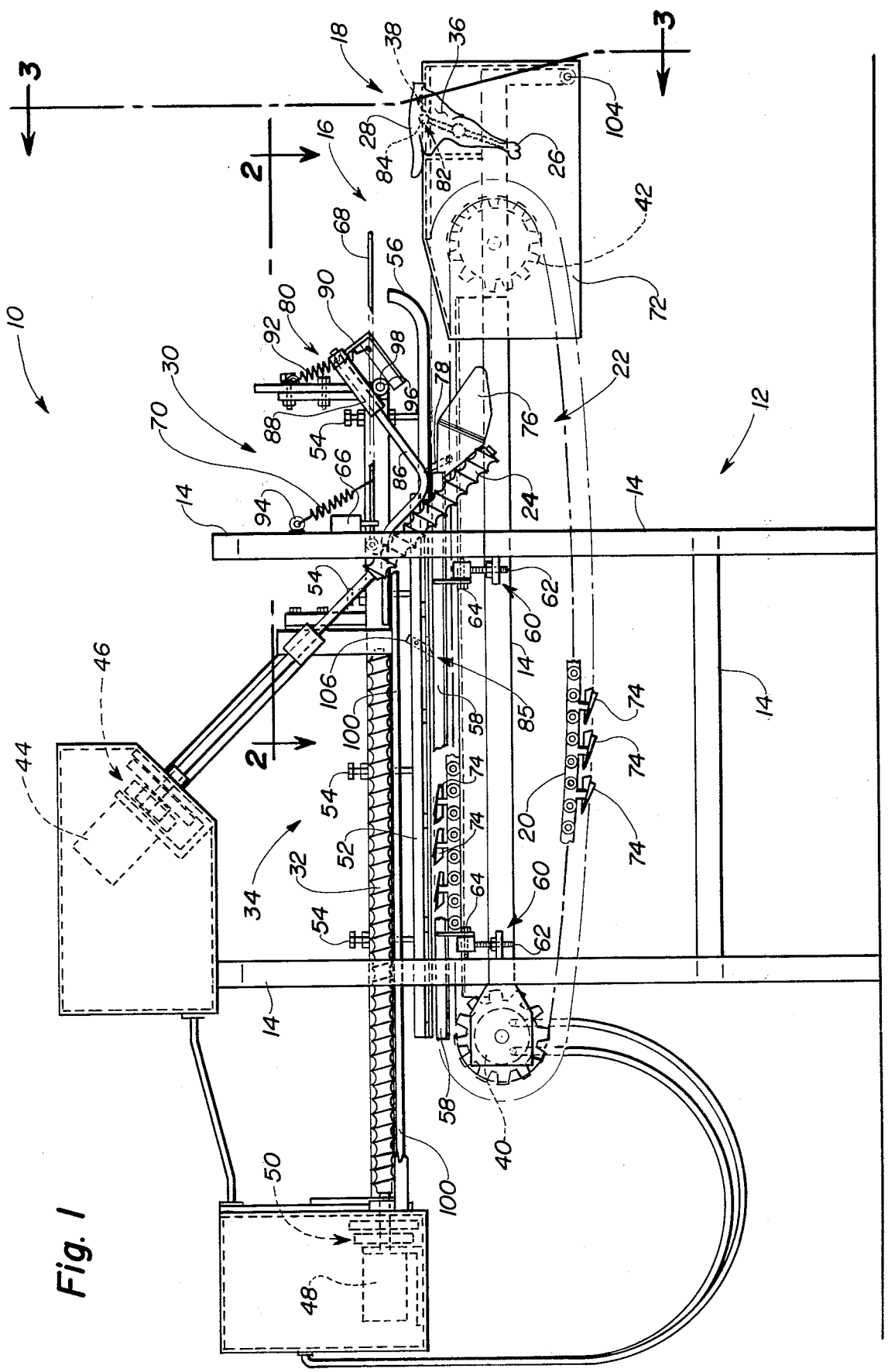
FIG. 1 is a side elevation of the poultry leg/back processor comprising the instant invention the same being shown with a typical poultry carcass saddle member positioned for infeed thereto.

Referring to FIG. 1, the present invention is shown which comprises a poultry leg/back processor 10 mounted upon a rigid supporting frame structure 12 comprised of interconnected horizontally and vertically disposed structural support members 14, wherein said processor 10 embodies as sub-assembly components thereof an infeed positioning and guide section 16 for receiving in manually fed tail-leading orientation delivery thereto a successive sequential deposit of typical poultry carcass saddle members 18 for engagement internally thereof by a chain link conveyor 20 for guided transport into the thigh tendon-severing and leg distending section 22 followed progressively by transfer to a spaced set of inclined auger conveyeors 24 whereby engagement of the respective poultry leg section hock protuberances 26 is accomplished in progressive coextensive transport thereof with the chain link conveyor 20 engagement of the poultry carcass back section portion 28 through the thigh joint-breaking transfer section 30 afterwhich transfer of said respective poultry leg section hock protuberances 26 from the spaced set of inclined auger conveyors 24 to an upwardly disposed rearwardly extending parallel spaced set of slower operating differential speed horizontal auger conveyors 32 of the differential speed horizontal auger dismembering section 34 is accomplished whereupon a progressive migratory pull-peeling dismemberment of the differentially slower moving poultry thigh-leg section 36 with a simultaneous peeling removal therewith of the oysters 38 from the same direction differentially faster parallel moving poultry carcass back section portion 28 driven by said chain link conveyor 20 is further accomplished for segregated delivery from said poultry leg/back processor 10 of three separated poultry section pieces being said poultry carcass back section portion 28 and two poultry thigh-leg sections 36 with oysters 38 attached in removal together.

Referring again to FIG. 1 to describe in greater detail the component parts of this invention as well as explain the operation thereof, wherein it is to be understood that the poultry carcass saddle members 18 which are successively fed to and reduced by the poultry leg/back processor 10 of the instant invention into three separated poultry section pieces as above-described, and hereinafter described in even greater detail, are obtained from other poultry processing operations such as rotary blade transverse severing of dressed whole poultry carcass members into front and rear halves.

In use application said processor 10 and the various poultry carcass saddle member conveyancing means thereof are driven by separate motor means respectively adjustable to obtain either coextensive displacement speeds or differential displacement speeds one with respect to the other. It is, however, the poultry carcass saddle member engagement and transport displacement speed set of the chain link conveyor 20, driven by the chain link conveyor hydraulic motor 40 in an endless counter-clockwise path about the chain link conveyor tension adjustment and idler sprocket 42, which establishes the relative coextensive transport speed set of the inclined auger conveyors 24 respectively driven by an inclined auger conveyor hydraulic motor 44 communicating therewith through the inclined auger conveyor rotary power and direction transmission 46 in accomplishing intermediate processing displacement of said poultry carcass saddle members 18 through the thigh joint-breaking transfer section 30, and thereafter establishes the relatively slower differential transport speed set of the horizontal auger conveyors 32 respectively driven by a horizontal auger conveyor hydraulic motor 48 communicating therewith through the horizontal auger conveyor rotary power and direction transmission 50 in accomplishing final processing displacement of said poultry carcass saddle members 18 through the differential speed horizontal auger dismembering section 34. All other processor 10 adjustments and sets are made with respect to the average physical dimension characteristics of the particular batch of typical poultry carcass saddle members 18 to be run, as will hereinafter be more fully detailed, but once made remain fixed for the duration of that particular batch run of processing.

Processor makeready adjustments of that type which are made and then fixed for the duration of the particular batch run include first, vertical adjustment of the poultry carcass back section portion hold-down rail 52 by means of the hold-down rail vertical adjustment assemblies 54 thereby enabling vertical displacement and then fixing of the hold-down rail 52 at an adjusted dimension which accommodates thickness of the poultry carcass back section portion 28 for passage with guided retention thereof at a uniform elevation from infeed to and through delivery from said processor 10. It should be noted that the processor infeed end of the hold-down rail 52 is provided with a curved inward-leading inverted V-shaped segment 56 to facilitate the tail leading infeed receiving to said processor 10 of a succession of manually fed and chain link conveyor 20 engaged poultry carcass saddle members 18. Complementary in adjustment to and cooperative with said hold-down rail 52 in maintaining guided retention control over said poultry carcass saddle members 18 during chain link conveyor 20 engaged transport thereof from infeed to and through delivery from said processor 10 is the split carcass saddle member interior support rail 58 each of the respective rail members thereof being both vertically and angularly adjustable with respect to said hold-down rail 52 by means of the interior support rail adjustment assemblies 60 to provide also further poultry carcass back section portion 28 thickness accommodation adjustment and set capabilities for both elevation adjustment set 62 and angularly adjustable split support rail set 64 to supportably conform the same to the outwardly sloping interior surfaces of the poultry carcass saddle members 18.

Also shown in FIG. 1 is the emergency stop switch 66 operable to stop all processor mechanical functions upon elevation of the spring biased switch bar 68 supportably disposed pivotally to the front operator end of the processor by means of a pair of switch bar suspension springs 70. In addition to the foregoing the processor infeed staging saddle 72 upon which said poultry carcass saddle members 18 are manually positioned spread-eagle for interior surface engagement thereof by one of the plurality of chain link conveyor dogs 74 of the chain link conveyor 20 and processor infeed movement therefrom across the leg-distending saddle 76 adapted to progressively move outwardly apart and oppositely away from the poultry carcass back section portion 28 the respective poultry thigh-leg sections 36 to expose for severing by the thigh-to-back section spaced set of tendon cutting blades 78 the connecting skin-tissue-tendon material therebetween whereby the poultry carcass saddle members 18 are made ready for infeed to the thigh joint-breaking transfer section 30 and subsequent dismembering processing operations thereafter following. With respect to the thigh joint-breaking transfer section 30 is likewise shown the counterbalanced spring-biased hock protuberance retaining and follower bar assembly 80 to be hereinafter upon detailed consideration of subsequent Figures to be more fully explained.

Considering FIG. 1 now as an illustration for explaining generally the overall operation and employment of said processor 10 in accomplishing the mechanical engagement and subsequent transport thereby of manually positioned and in-fed poultry carcass saddle members 18 for in turn accomplishing the processing dismemberment thereof to deliver therefrom two integrally connected poultry thigh-leg sections 36 with oysters 38 thereto attached as pull-peel separated from the poultry carcass back section portion 28. Initially, the chain link conveyor 20, driven by the chain link conveyor hydraulic motor 40, is activated and operated at a transport speed suitable for maintaining guided control over the typical poultry carcass saddle members 18 of that particular batch run to be processed for which the various processor hold-down and support rail members had been previously set as heretofore described. Second, the inclined auger conveyors 24, driven by the inclined auger conveyor hydraulic motor 44 through the interposed rotary power and direction transmission 46, is activated and operated at a relative horizontal displacement speed and direction at or near that accomplished upon a poultry carcass back section portion 28 by the selected chain link conveyor 20 transport speed set, thereby accomplishing separately driven but coactive horizontal transport of a poultry carcass saddle member 18 engaged by the back section portion 28 and the respective leg section hock protuberances 26 thereof through the thigh joint-breaking transfer section 30 of said processor 10, so that although the horizontal displacement increments of one poultry carcass saddle member section with respect to the others when still in a joined state is coactively equal, or nearly so thereto, the vertical elevation displacement configurations of one such section with respect to the other changes, as will hereinafter be discussed in detail upon specific illustration consideration thereof, thereby passing the thigh-to-back section crotch junctures 82 respectively in outwardly stretched and openly exposed disposition upon the leg-distending saddle 76 in progressive movement across the thigh-to-back section spaced set of tendon cutting blades 78 for cutting through the connecting skin-tissue-tendon material therebetween and thereafter upon respective leg section hock protuberance 26 engagement by the inclined auger conveyors 24 thereby accomplish pivotal vertically rotary displacements of the thigh-to-back section crotch juncture joints 84 which are necessary to initiate the accomplishment of removing the poultry thigh-leg sections 36 with oysters 38 thereto attached respectively from the carcass back section portion 28 by that progressive migration of pull-peel dismemberment method provided by said processor 10 of instant invention. Third, to complete the pull-peel dismemberment method hereof, accomplished upon delivery of poultry carcass saddle members 18 from the thigh joint-breaking transfer section 30 to the differential speed horizontal auger dismembering section 34, the horizontal auger conveyors 32, driven by the horizontal auger conveyor hydraulic motor 48 through the interposed horizontal auger conveyor rotary power and direction transmission 50, is activated and operated at a relative horizontal displacement speed and direction slower than that selected and set for the chain link conveyor 20 transport operation, thereby accomplishing a continued separate poultry carcass saddle member 18 back section portion 28 engagement and driving with respect to the respective leg section hock protuberances 26 thereof but now at differential horizontal displacement increments of transport speed of one poultry carcass saddle member section with respect to the other such as to thereby cause as a result thereof a progressive pull-peel dismemberment migration of the now severed thigh-to-back section crotch juncture 82 skin-tissue-tendon material therebetween and the vertically rotated and dislocated thigh-to-back section crotch juncture joints 84 resulting in a simultaneous migratory differential speed pull-peel removal of the respective poultry thigh-leg sections 36 with oysters 38 thereto attached in separated delivery thereof from the poultry carcass back section portion 28.

Later to be discussed in alternative structural detail on subsequent illustration consideration thereof, but however shown in FIG. 1, is the back section skin-severing knife assembly 85 which operates to cut the back section portion covering skin tissue prepatory to completion of pull-peel dismemberment processing.

Preferably, the poultry leg/back processor hereof as illustrated and described in consideration of FIG. 1 is constructed of corrosive resistant metal alloys and plastics such as stainless steel and the trade-named product known as Teflon, but any other suitable materials or combinations thereof may be used.

Referring now to FIG. 2 and FIG. 3 in a combined and concurrent consideration thereof both of which illustrate more detailed processor structural features of lead-in from the infeed positioning and guide section 16 to the thigh joint-breaking transfer section 30 and the exit structure therefrom to the differential speed horizontal auger dismembering section 34, wherein FIG. 2 is an enlarged top plan view thereof as seen along the line 2—2 of FIG. 1 and FIG. 3 is an enlarged end sectional elevation thereof as seen along the line 3—3 of FIG. 1. In particular, additional to those structural elements and assemblies previously discussed, greater structural detail and functional aspects of the counterbalanced spring-biased hock protuberance retaining and follower bar assembly 80 is shown, it having as a component structure thereof a spaced set of hock protuberance retaining and follower bars 86 each of which bars 86 are in turn adjustably inserted both with respect to rotational and extension orientation respectively into a counter-balance member support collar 88 with adjustable counter-balance set and retaining spring connecting member 90 each of which such members 90 respectively supports an adjustable counter-balance tension spring 92 in operational connection therebetween to an upwardly disposed and angularly inward offset centrally positioned support frame spring keeper 94, wherein each of the counter-balance member support collars 88 are fixedly assembled at co-equal horizontally disposed angular dispositions to rotational bearing collars 96 each being slidably assembled for pivotal disposition thereof upon opposite spaced ends of a centrally intermediate bearing collar support shaft 98. By virtue of the foregoing pivotal and spring-biased hock protuberance retaining and follower bar assembly structure the follower bars 86 thereof are maintained in a yieldable yet close proximity disposition respectively to the inclined auger conveyors 24 as respectively shown in FIG. 2 and FIG. 3 and thereby simultaneously provide coextensive horizontal transport and elevated rotary movement of the poultry thigh-leg sections 36 with respect to a poultry carcass back section portion 28 during respective poultry leg section hock protuberance 26 engagement and transport displacement by said inclined auger conveyors 24. Cooperatively communicating with the hock protuberance retaining and follower bars 86 are the horizontal auger conveyor hock protuberance spaced set of retaining and follower bars 100 which function similar to the former recited follower bars 86 in the respect of maintaining close proximity disposition respectively however to the horizontal auger conveyors 32 upon progressive processing transfer of the poultry thigh-leg sections 36 from the thigh joint-breaking transfer section 30 to the differential speed horizontal auger dismembering section 34 but in this instance mechanically unyieldable during dismemberment processing operations per se by means of fixed elevation yet horizontally slidable hock protuberance 26 upward support between said spaced set of retaining and follower bars 100, wherein as will be later illustrated and discussed in greater detail it is the motion combination in continuing processing operation through the differential speed horizontal auger dismembering section 34 of slidably maintaining the respective leg section hock protuberances 26 at a fixed spaced elevation with the slower horizontal displacement speed differential thereof with respect to the faster moving chain link conveyor 20 chain link conveyor dog 74 engaged and transported poultry carcass back section portion 28 being the mechanism whereby is accomplished completion of the progressive migration of pull-peel dismemberment method provided hereby.

Figure 4:
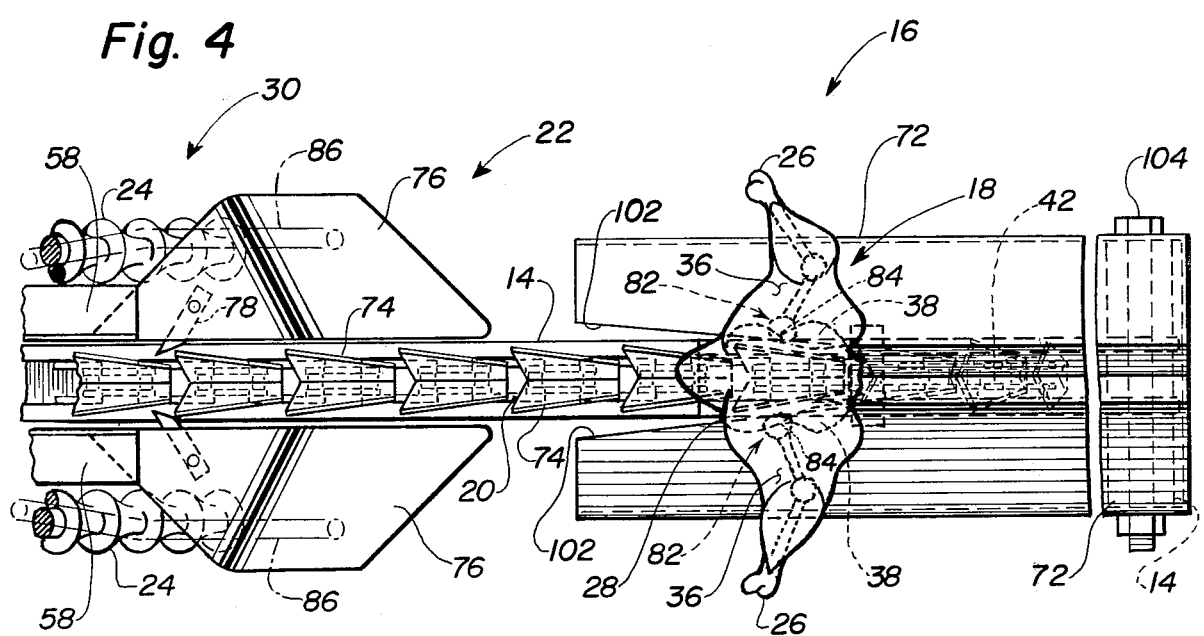
FIG. 4 is an enlarged top plan view of the poultry leg/back processor infeed positioning and guide section shown in FIG. 3 as seen along the line 4—4 thereof further showing a typical poultry carcass saddle member in conveyor engaged disposition immediately prior to guided transport thereby into the thigh tendon severing and leg distending section.
Figure 5:
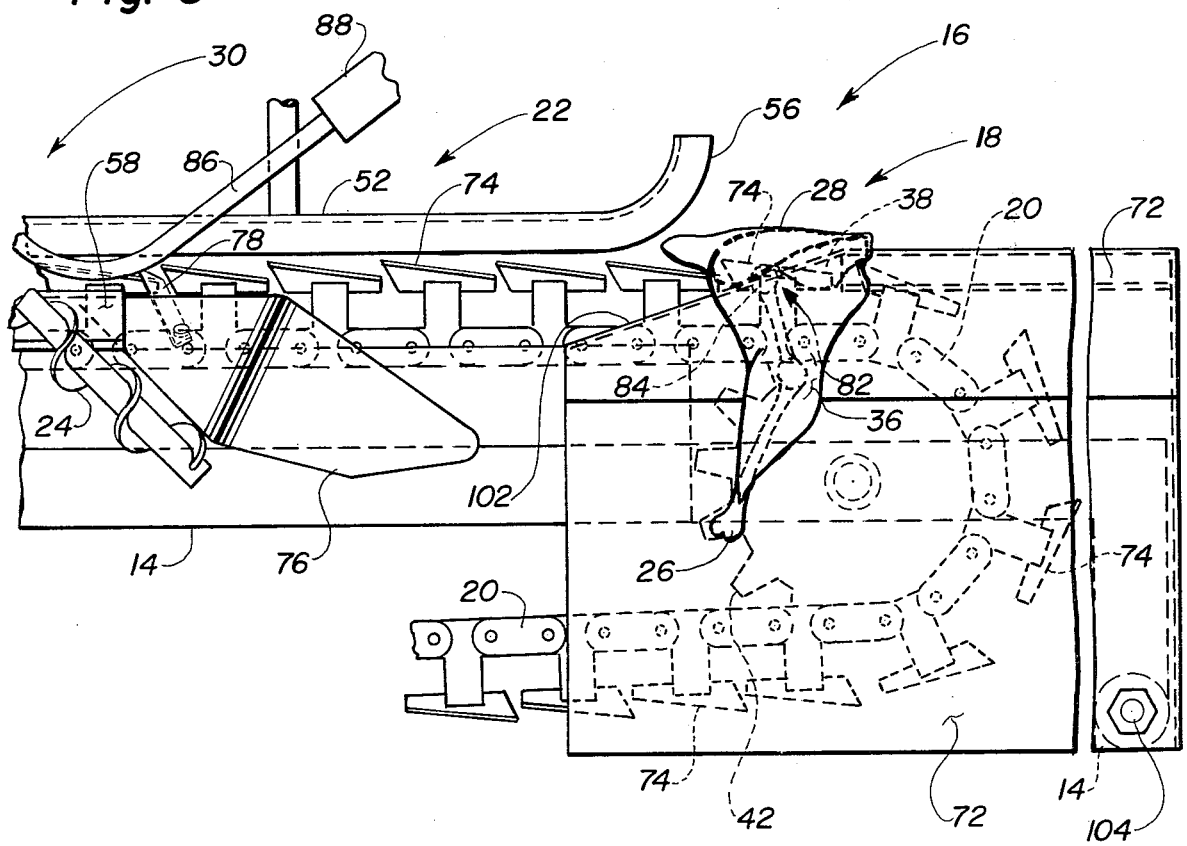
FIG. 5 is an enlarged side elevation of the poultry leg/back processor infeed positioning and guide section shown in FIG. 2 as seen along the line 5—5 thereof further showing a typical poultry carcass saddle member configuration corresponding to that illustratred in FIG. 4 in conveyor engaged disposition immediately prior to guided transport thereof into the thigh tendon severing and leg distending section.

Turning now to a detailed sequential consideration of processor 10 operation in accomplishing the poultry leg/back migratory pull-peel dismemberment method hereof, the initial steps of which being poultry carcass saddle member 18 infeed positioning as shown in enlarged top plan view in FIG. 4 and in a comparable side elevation view thereto as shown in FIG. 5 both of which Figures are regarded concurrently in detailed consideration of infeed operations. As earlier recited, poultry carcass saddle members 18 from the particular batch to be run are manually positioned sequentially, in a tail-leading spread-eagle disposition upon the processor infeed staging saddle 72 as shown and manually slid, machine-inward in such disposition to that position also as shown where the sloped staging saddle opening 102 adapted to provide communicative engagement with poultry carcass back section portion interior vertebra bone structure detents by one of the plurality of chain link conveyor dogs 74 carried by the chain link conveyor 20 in order that the carcass saddle member 18 may be positively fed through the processor 10 at that processing speed set accomplished as previously described. Upon chain link conveyor 20 engagement thus the poultry carcass saddle member 18 slidably engages the back section portion hold-down rail curved inward-leading inverted V-shaped segment 56 and is thereby slidably secured in transport for delivery and continued processing operation through the thigh tendon-severing and leg distending section 22. As best shown in FIG. 4, the respective poultry thigh-leg sections 36 are openly disposed by manual infeed positioning of the poultry carcass saddle member 18 upon the processor infeed staging saddle 72 and thereby pre-positioned for slidably distensible engagement over the leg-distending saddle 76 to in turn thereby expose for severing by the thigh-to-back section spaced set of tendon cutting blades 78 the connecting skin-tissue-tendon material therebetween vicinity the thigh-to-back section crotch junctures 82. Also shown in greater detail respectively in FIG. 4 and FIG. 5 is the processor infeed staging saddle retaining bolt 104 whereby the processor infeed staging saddle 72 is secured to the interconnected structural support member 14 for operational use in carcass saddle member 18 infeed as above described or removed therefrom for cleaning or the performance of maintenance or repair functions upon processor assembly components enclosed thereby.

Figure 6:
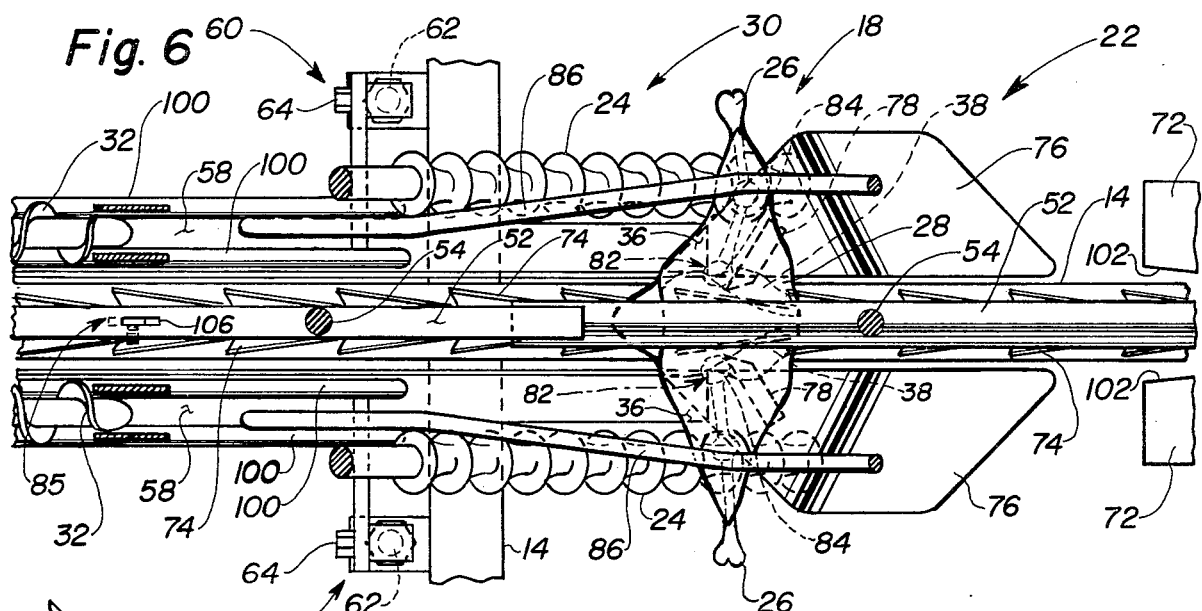
FIG. 6 is an enlarged top plan view of the poultry leg/back processor infeed section with the previously shown typical poultry carcass saddle member advanced by conveyor engaged guided transport into the thigh tendon severing and leg distending section immediately prior to guided transport therefrom into the thigh joint-breaking transfer section.
Figure 7:
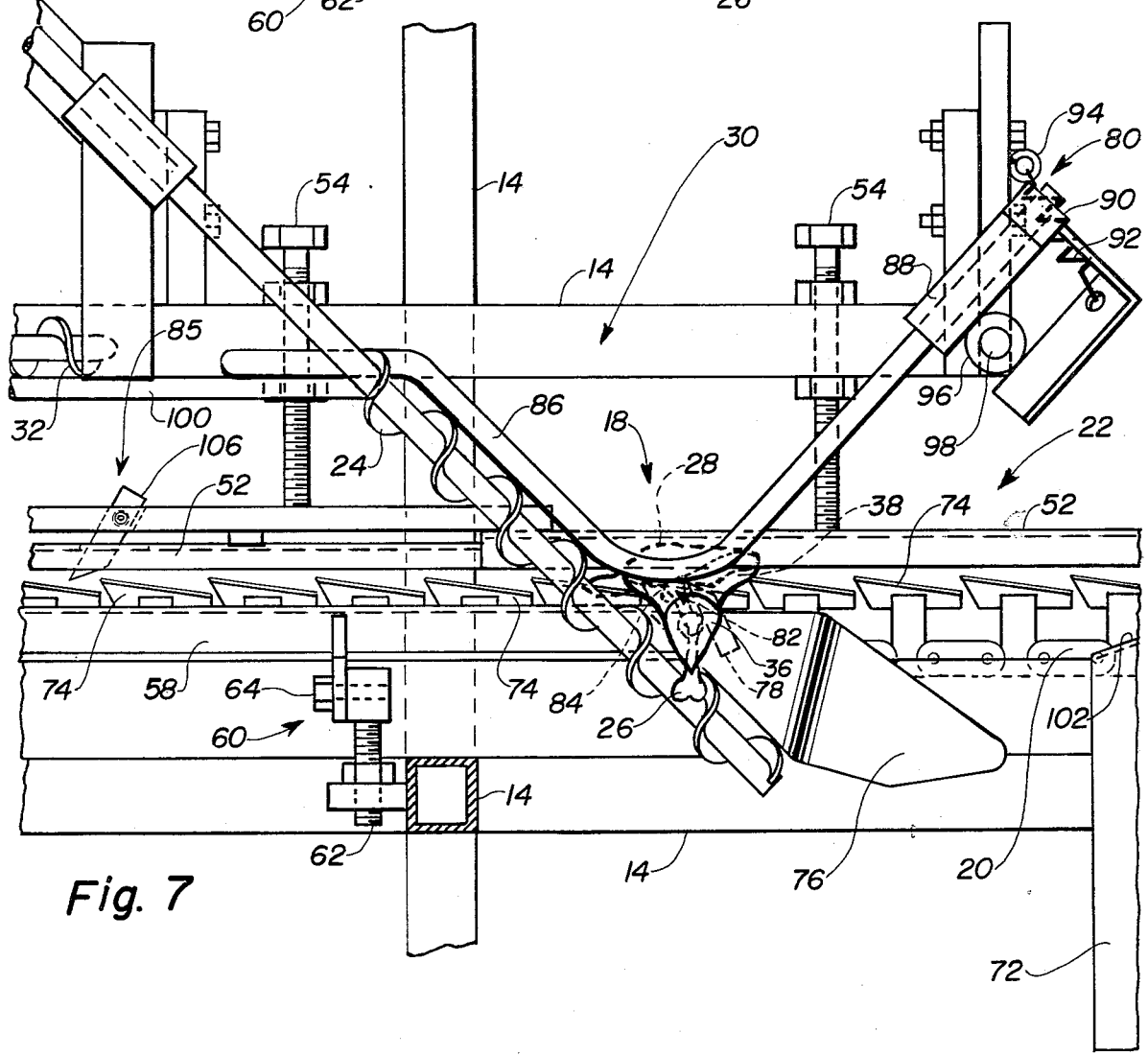
FIG. 7 is an enlarged side elevation of the poultry leg/back processor infeed section with typical poultry carcass saddle member configuration corresonding to the top plan view earlier shown in FIG. 6.

Considering now concurrently FIG. 6 and FIG. 7 in the continuing detailed description of the instant invention processing method wherein FIG. 6 is a top plan view of the thigh tendon-severing and leg distending section 22 showing operationally disposed therein the typical poultry carcass saddle member 18 of instant discussion immediately prior to guided transport thereof into the thigh joint-breaking transfer section 30, and FIG. 7 is a comparable side elevation view of the processor 10 and saddle member 18 distended disposition as shown in FIG. 6. It will be noted first, upon a comparison of the instant two Figures of consideration with the previous two Figures, that the respective thigh-leg sections 36 have, in being slidably passed across the leg-distending saddle 76, been outwardly stretched and upwardly rotated about the thigh-to-back section crotch junctures 82. Secondly, that said thigh-to-back section crotch junctures 82 respectively being thereby exposed and positioned are shown in the process of passage across the spaced set of tendon cutting blades to accomplish severing of the connecting skin-tissue-tendon material therebetween in order to initiate the dismemberment migration in make ready preparation for infeed transport to the thigh joint-breaking transfer section 30. And, thirdly, in the distended thigh-leg section 36 disposition shown, the same are respectively positioned to be engaged immediately inward of the leg section hock protuberances 26 thereof in retained slidable and yieldable coactive transport securement between the inclined auger conveyors 24 and the respective spring biased hock protuberance retaining and follower bars 86. It is at this point of processing operation transfer from the thigh tendon-severing and leg distending section 22 to the thigh joint-breaking transfer section 30 that a singular transport movement of the poultry carcass saddle member 18 by the chain link conveyor 20 alone transposes to a coactive horizontal displacement movement thereof with chain link conveyor 20 thereafter displacing the poultry carcass back section portion 28 and the respective inclined auger conveyors 24 both vertically and horizontally moving the distended thigh-leg sections 36 generally in coextensive horizontal displacement therewith.

Figure 8:
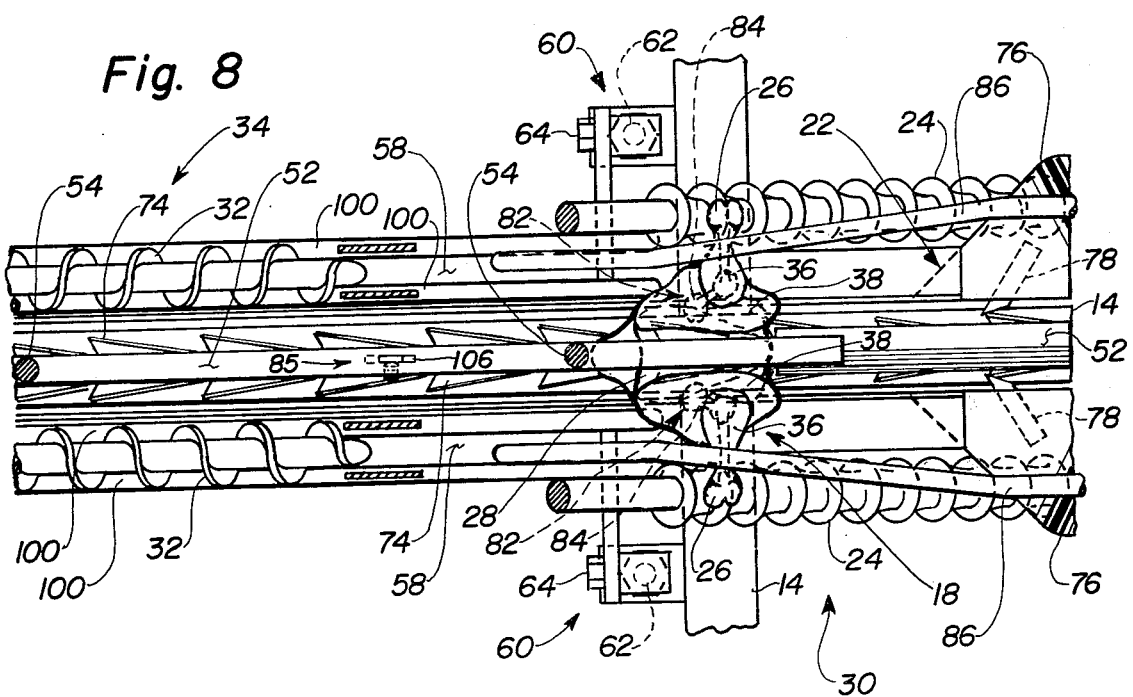
FIG. 8 is an enlarged top plan view of the poultry leg/back processor thigh joint-breaking transfer section with the previously shown typical poultry carcass saddle member being coextensively advanced therethrough by both conveyor engaged and inclined auger engaged transport in thigh joint-breaking disposition immediately prior to guided delivery therefrom into the differential speed horizontal auger dismembering section.
Figure 9:
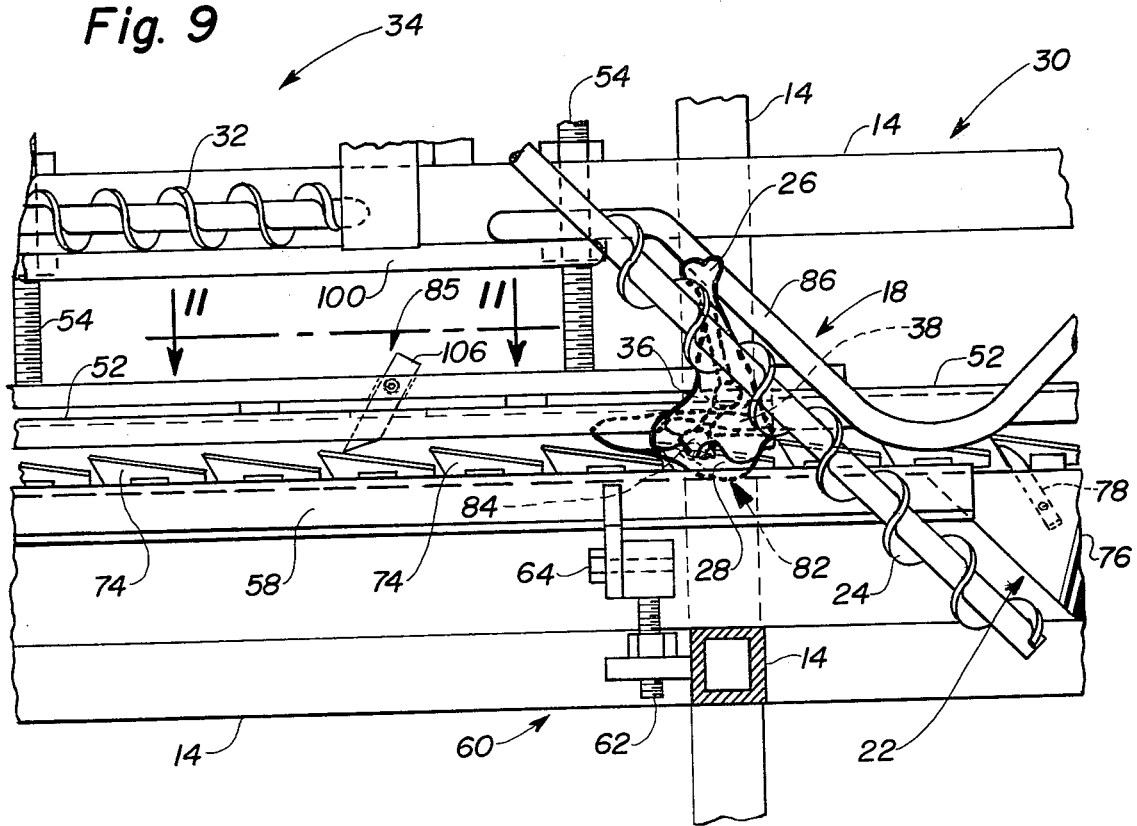
FIG. 9 is an enlarged side elevation of the poultry leg/back processor thigh joint-breaking transfer section with typical poultry carcass saddle member configuration corresponding to the top plan view earlier shown in FIG. 8.

The views shown in FIG. 8 and FIG. 9 respectively illustrate a top plan view with and corresponding side elevation of the thigh joint-breaking transfer section 30 showing operationally disposed therein the typical poultry carcass saddle member 18 of instant discussion being coactively and coextensively horizontally moved by chain link conveyor 20 and inclined auger conveyor 24 engagement of the carcass back section portion 28 and thigh-leg sections 36 with the latter being respectively maintained in inclined auger conveyor driven disposition by hock protuberance retaining and follower bars 86 whereby is also accomplished thigh-leg section 36 elevation to cause rotation of the severed thigh-to-back section crotch juncture joints 84 and dislocation thereof such that progressive pull-peel dismemberment migration of the respective thigh-leg sections 36 with oysters 38 thereto attached from the poultry carcass back section portion 28 is initiated for accomplishment of completion upon carcass saddle member 18 transfer to and transport through the differential speed horizontal auger dismembering section 34. In operation of the thigh joint-breaking transfer section 30 as hereinbefore described, the operational speed set of the respective inclined auger conveyors 24 will be such that the horizontal displacement of thigh-leg sections 36 engaged and moved thereby will in general be coextensively equal to that set of the chain link conveyor 20 whereby is accomplished horizontal displacement of the still connected poultry carcass back section portion 28. However, at times, in order to accomplish facilitated rotation and dislocation of the severed thigh-to-back section crotch juncture joints 84 in some processing circumstances it may be necessary and desirable to operate the set of the respective inclined auger conveyors 24 at speeds to provide either faster or slower horizontal displacement movements of the thigh-leg sections 36 with respect to the horizontal displacement movement of the carcass back section portion 28 connected thereto, and notwithstanding the typical coextensive horizontal movement setting of the inclined auger conveyors 24 to the chain link conveyor 20 it is to be understood that differentially faster or slower horizontal displacement settings thereof may be employed.

Figure 10:
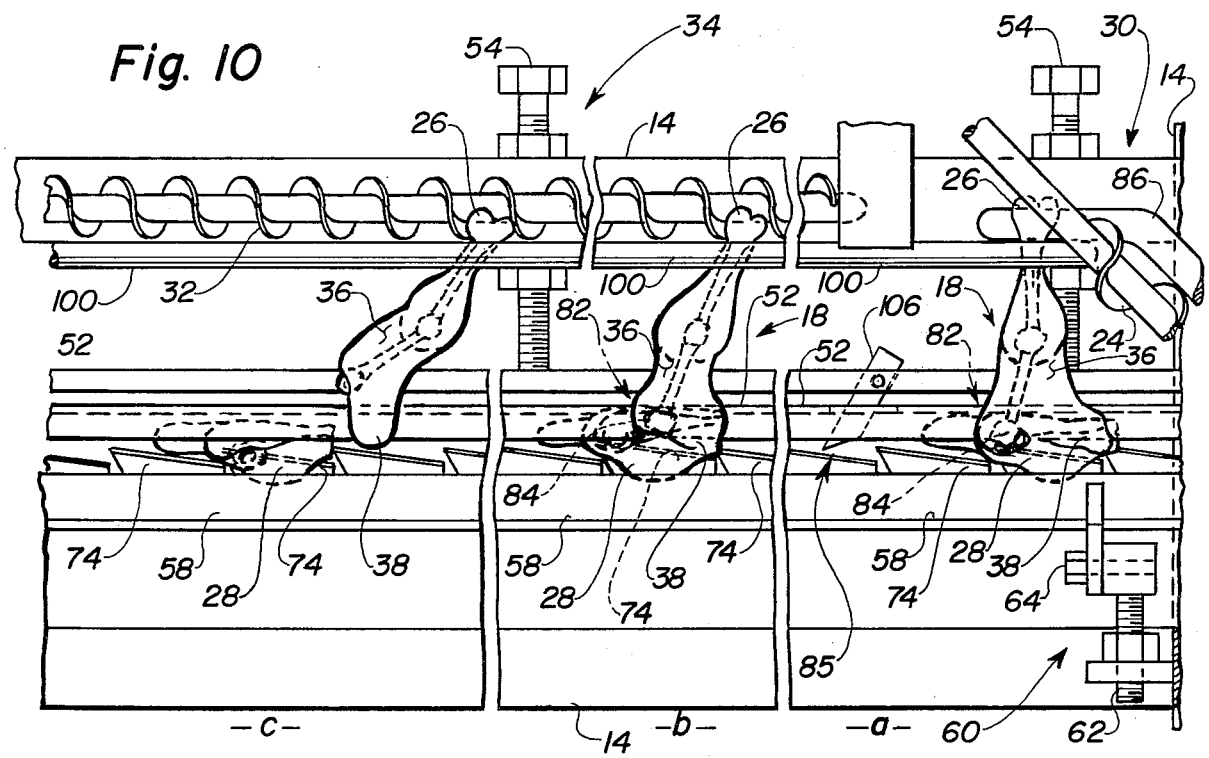
FIG. 10 is an enlarged sequential side elevation of the poultry leg/back processor differential speed horizontal auger dismembering section, foreshortened to accommodate the view to the sheet, showing therein the progressive migratory pull-peeling dismemberment of the thigh leg section from the back section with a simultaneous peeling removal of the oysters.

Considering now the composite foreshortened side elevation view shown in FIG. 10 which illustrates the receiving and further processing to completion of those partially processed poultry carcass saddle members 18 delivered thereto from the thigh joint-breaking transfer section 30 to the differential speed horizontal auger dismembering section 34 thereby to accomplish longitudinal severing of the poultry carcass back section skin by means of the back section skin-severing knife assembly 85 and thereafter migratory pull-peel dismemberment to deliver three separated section pieces as hereinafter more fully described.

In composite view segment FIG. 10a the effecting of transport of the thigh-leg sections 36 from generally coactive horizontally forward driven motion at the upward vertical displacement disposition respectively thereof as accomplished by the inclined auger conveyors 24, and delivery therefrom to the horizontal auger conveyor hock protuberance spaced set of retaining and follower bars 100, is shown, whereupon continued forward horizontal transport of the partially processed poultry carcass saddle member 18, prior to thigh-leg section 36 re-engagement by the horizontal auger conveyors 32 for accomplishing differential speed horizontal displacement transport movement respectively thereof in order to accomplish and complete migratory pull-peel dismemberment, is provided by the chain link conveyor 20 which also drives the poultry carcass back section portion 28 through the back section skin-severing knife assembly 85 whereby a single back skin severing blade 106 thereupon operates to longitudinally cut centrally intermediate thereof the back section skin along a line such that equal half-portions of the back section skin are thereafter also removed with each thigh-leg section 36 when respectively pull-peel separated from the carcass back section portion 28. The single back skin severing blade line of cut 108, sometimes known as the "Japanese Cut", is more clearly shown as such in the FIG. 13 enlarged top plan view of a typical poultry carcass saddle member.

In the FIG. 10b composite view segment the leg section hock protuberances 26 of the thigh-leg sections 36 have each been engaged respectively by the horizontal auger conveyors 32 for horizontal displacement movement thereof at a differentially slower transport speed than that of the carcass back section portion 28 remaining in continued transport engagement with the faster moving chain link conveyor 20, thus initiating as shown in the FIG. 10b composite view segment commencement of a progressive pull-peel dismemberment of respective thigh-leg sections 36 with oysters 38 thereto attached from the differentially faster forwarded carcass back section portion.

Lastly, in the FIG. 10c composite view segment completion of pull-peel dismemberment processing of a poultry carcass saddle member to yield a back section portion 28 and two separated thigh-leg sections 36 with oysters 38 thereto attached is shown, and as therein seen, the differential speed effects in providing the migratory pull-peel method hereof progressively to the accomplishment of dismemberment operations is completed.

Figure 11:
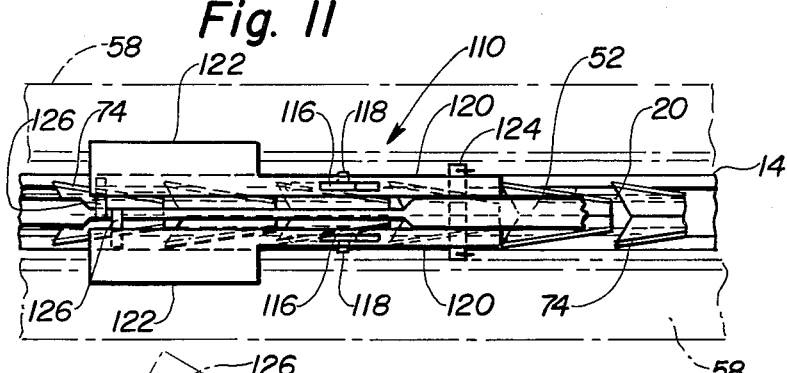
FIG. 11 is an enlarged top plan view of that back skin severing knife assembly for alternately accomplishing the so-called "American Cut".
Figure 12:
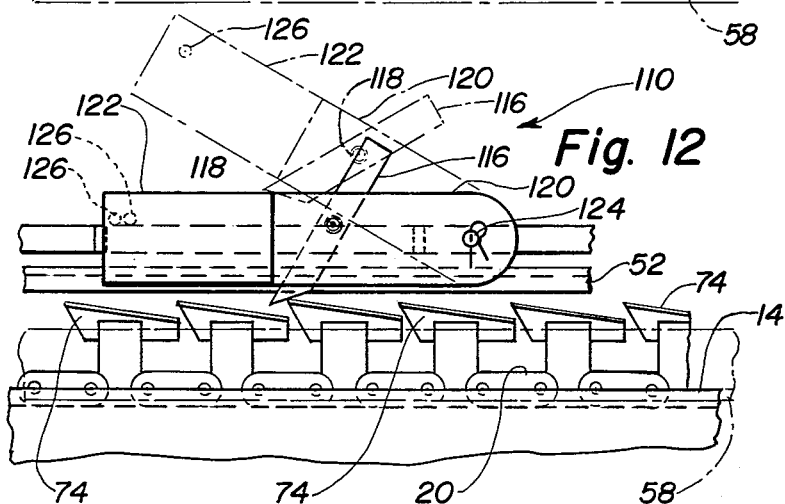
FIG. 12 is a side elevation of the "American Cut" back skin severing knife assembly corresponding to the top plan view earlier shown in FIG. 11, and further showing in phantom illustration the operation thereof.
Figure 13:
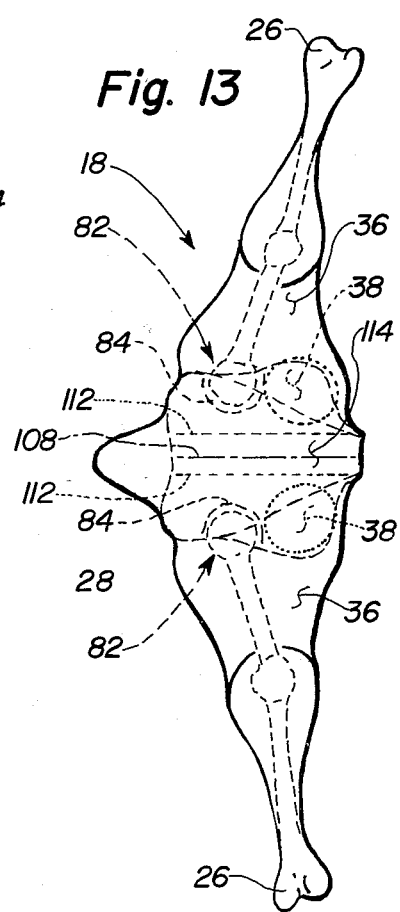
FIG. 13 is an enlarged top plan view of a typical poultry carcass saddle member showing the exemplary anatomical disposition thereof when configured in a leg-distended attitude, and also showing therein a relative comparison along the back section portion thereof the "American Cut" to the "Japanese Cut".

The respective views shown in FIG. 11 and FIG. 12 illustrate the dual back section skin-severing knife assembly 110 as an alternate embodiment for accomplishing the so-called "American Cut" generally as is described along the dual cut line traces 112 shown in FIG. 13 the effect of which is to leave an elongated centrally intermediate patch of skin 114 on the carcass back section portion 28 and thereby reduce that amount of back skin removed with the thigh-leg sections 36 during dismemberment, which under some food processing regulatory requirements is necessary as is presently the case in the United States. As best illustrated in the side elevation view of FIG. 12, the spaced blades 116 of the dual back section skin-severing knife assembly 110 are secured by lock pins 118 within pivot arms 120 and operable in arcuate deflection against counter weights 122 about pivot pin 124 as a carcass back section portion is transported by the chain link conveyor 20 beneath the respective spaced blade cutting edges, as shown in phantom in FIG. 12, and pivotally returnable to a stay-position configuration as maintained by stop pin 126 engagement with the frame member as also shown in FIG. 12.

The illustration shown in FIG. 13 is an enlarged top plan view of that typical poultry carcass saddle member 18 as herein discussed, showing in greater detail the exemplary anatomical disposition thereof when configured in a spread-eagle leg-distended attitude, and also showing therein a relative comparison along the back section portion 28 thereof the single back skin severing blade line of cut 108 to that of the dual cut line traces 112.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A poultry leg/back processor adapted for sequentially receiving a succession of manually fed poultry carcass saddle members with the tail ends thereof positioned foremost leading thereto wherein the processor is thereafter operable automatically to engage and pull-peel dismember from a carcass back section portion of said saddle members respectively from either transverse side thereof a connected thigh-leg section each with an oyster thereto attached and deliver therefrom as separated components said carcass back section portion and two thigh-leg sections said processor comprising in combination:
   a. an elongated rigid supporting frame structure provided with interconnected horizontally and vertically disposed support members and having an infeed end and a delivery end the respective longitudinal extremities thereof,
   b. an infeed end infeed positioning and guide section adapted for receiving in manually fed positioning thereto said succession of poultry carcass saddle members in a leg-spread tail end inward leading disposition,
   c. a downwardly disposed chain link conveyor laterally intermediate and longitudinally extending about an infeed end sprocket and a delivery end sprocket respectively mounted upon laterally disposed shafts supported in said rigid supporting frame structure in longitudinally spaced relationship therein and rotationally powered in horizontal displacement delivery end direction feeding motion about said sprockets by a first motor means regulated to a first set horizontal displacement speed for chain link conveyor engagement and transport processor delivery end direction thereby of said poultry carcass saddle members by one of a plurality of chain link conveyor spatially connected dog means respectively interior the back section portion thereof,
   d. a leg-distending saddle adapted to slidably receive said succession of poultry carcass saddle members in a leg-spread tail end inward leading disposition and outwardly distend said legs further to thereby openly expose the thigh-to-back section crotch junctures thereof respectively for guided passage engagement across a spaced set of tendon cutting blades to accomplish a severing of the connecting skin-tissue-tendon material therebetween vicinity said thigh-to-back section crotch junctures,
   e. a thigh joint-breaking transfer section embodying a spaced set of inclined auger conveyors rotationally powered delivery end feeding by a second motor means regulated to a horizontal delivery end direction displacement speed set equivalent to said first set horizontal displacement speed and positioned to receivably engage respectively a poultry leg section hock protuberance the end of each of said outwardly distended legs and thereby provide respectively a joined coextensive horizontal delivery end direction transport thereof with said carcass back section portion and simultaneously therewith effect an elevated rotary movement respectively of said thigh-leg sections with respect to said carcass back section portion,
   f. a carcass back section portion skin-severing knife assembly adapted to sever the carcass back section portion skin in a longitudinal direction along at least one line laterally intermediate thereof, and
   g. a differential speed horizontal auger dismembering section embodying a spaced set of horizontal auger conveyors rotationally powered delivery end feeding by a third motor means regulated to a horizontal delivery end direction displacement speed set slower than said first set horizontal displacement speed and positioned to receivably engage respectively said poultry leg section hock protuberances slidably in maintaining each of said outwardly distended legs outwardly at an elevated position and a horizontal delivery end direction displacement speed slower than that of said chain link conveyor transported carcass back section portion and thereby effect a differential speed pull-peel dismemberment of the respective thigh-leg sections with oysters thereto attached for separate deliveries thereof from said carcass back section portion.

2. The poultry leg/back processor according to claim 1 in which said infeed end infeed positioning and guide section is provided with a processor infeed staging saddle.

3. The poultry leg/back processor according to claim 2 in which said first motor means is a hydraulic motor.

4. The poultry leg/back processor according to claim 3 in which said spaced set of inclined auger conveyors are respectively provided with a hock protuberance retaining and follower bar.

5. The poultry leg/back processor according to claim 4 in which each of said hock protuberance retaining and follower bars are spring-biased.

6. The poultry leg/back processor according to claim 5 in which said carcass back section portion skin-severing knife assembly is provided with a single knife blade positioned to accomplish carcass back section portion cutting of skin along a longitudinal line centrally intermediate the lateral dimension thereof.

7. The poultry leg/back processor according to claim 5 in which said carcass back section portion skin-severing knife assembly is provided with a spaced dual knife blade means positioned to accomplish carcass back section portion cutting of skin along a spaced dual cut longitudinal line trace centrally intermediate the lateral dimension thereof.

8. The poultry leg/back processor according to claim 6 in which said single knife blade is stationary.

9. The poultry leg/back processor according to claim 7 in which said spaced dual knife blade means is pivotally deflectable upward during passage of a poultry carcass back section portion therebeneath.

10. The poultry leg/back processor according to claim 9 in which said spaced dual knife blade means is provided with a counter weight.

11. A method of dismembering poultry carcass saddle members into a poultry carcass back section portion and two poultry thigh-leg sections each respectively with an oyster thereto attached comprising the steps:
   a. distending in outward opposing disposition respectively said poultry thigh-leg sections of said poultry carcass saddle member away from the carcass back section portion to thereby openly expose a thigh-to-back section crotch juncture on either lateral side thereof,
   b. severing the skin-tissue-tendon connecting material comprising each of said thigh-to-back section crotch junctures,
   c. displacing each thigh-to-back section crotch juncture joint by a vertically rotary displacement respectively of each thigh-leg section to a laterally disposed elevated position relative to said back section portion, and
   d. while maintaining each of said thigh-leg sections respectively in said laterally disposed elevated position relative to said back section portion moving said back section portion at a differentially faster horizontal displacement speed than said thigh-leg sections to thereby effect a progressive migratory pull-peel dismemberment removal of said thigh-leg sections with oysters thereto attached from said back section portion in a manner by which each separated section is substantially free of bone fragment contamination.

* * * * *

Disclaimer 4,385,421.—*Eugene G. Martin*, New Holland, Pa. POULTRY LEG/BACK PROCESSOR. Patent dated May 31, 1983. Disclaimer filed July 11, 1983, by the asssignee, *Victor F. Weaver, Inc.*

Hereby enters this disclaimer to claims 9 and 10 of said patent.

[*Official Gazette August 30, 1983.*]